United States Patent
Al-Shammari

(10) Patent No.: US 9,073,101 B2
(45) Date of Patent: Jul. 7, 2015

(54) METHOD AND APPARATUS FOR UNPLUGGING HYDROCARBON DRAINS OR VENTS

(75) Inventor: Saleh H. Al-Shammari, ABQ (SA)

(73) Assignee: Saudi Arabian Oil Company (SA)

( * ) Notice: Subject to any disclaimer, the term of this patent is extended or adjusted under 35 U.S.C. 154(b) by 178 days.

(21) Appl. No.: 13/611,632

(22) Filed: Sep. 12, 2012

(65) Prior Publication Data
US 2013/0092249 A1    Apr. 18, 2013

Related U.S. Application Data

(60) Provisional application No. 61/533,591, filed on Sep. 12, 2011.

(51) Int. Cl.
| | |
|---|---|
| *F16K 29/00* | (2006.01) |
| *B08B 9/02* | (2006.01) |
| *B08B 9/04* | (2006.01) |
| *B08B 9/043* | (2006.01) |
| *E21B 34/02* | (2006.01) |
| *E21B 37/00* | (2006.01) |
| *E21B 41/00* | (2006.01) |

(52) U.S. Cl.
CPC . *B08B 9/021* (2013.01); *B08B 9/04* (2013.01); *B08B 9/043* (2013.01); *F16K 29/00* (2013.01); *E21B 34/02* (2013.01); *E21B 37/00* (2013.01); *E21B 41/005* (2013.01)

(58) Field of Classification Search
CPC ......... F16K 29/00; B08B 9/027; B08B 9/043; B08B 9/0436; E21B 34/02; E21B 37/00; E21B 41/005
USPC ...................... 137/244, 242, 15.07
See application file for complete search history.

(56) References Cited

U.S. PATENT DOCUMENTS

| | | | |
|---|---|---|---|
| 452,535 A * | 5/1891 | Winkler | ........... 137/244 |
| 837,035 A | 11/1906 | Butler | |
| 2,020,241 A | 11/1935 | Dimmig | |
| 2,448,816 A | 9/1948 | May | |
| 2,514,339 A | 7/1950 | Robinson et al. | |

(Continued)

FOREIGN PATENT DOCUMENTS

GB    1523042 A    8/1978

OTHER PUBLICATIONS

PCT International Search Report and the Written Opinion of the International Searching Authority dated Nov. 7, 2013; International Application No. PCT/US2012/054713; International File Date: Sep. 12, 2012.

*Primary Examiner* — Kevin Lee
(74) *Attorney, Agent, or Firm* — Bracewell & Giuliani LLP; Constance Gall Rhebergen; Linda L. Morgan

(57) ABSTRACT

Embodiments of an apparatus can be used for unplugging a component of a hydrocarbon transportation or storage unit. Embodiments can include a main body, which can have a central passage through a length of the main body; a secondary passage transverse to the central passage; and a connector end operable to connect the body to the component. Embodiments of the apparatus can also include a valve in fluid communication with the secondary passage, a pressure gauge in fluid communication with the valve, a system connector in fluid communication with the valve, operable to connect the apparatus to a dosed system, and a poker rod operable to move within the central passage of the main body.

25 Claims, 4 Drawing Sheets

(56) References Cited

U.S. PATENT DOCUMENTS

| | | | |
|---|---|---|---|
| 2,614,885 A * | 10/1952 | Roell et al. | 137/244 |
| 2,871,881 A * | 2/1959 | Hewson | 137/597 |
| 2,936,000 A * | 5/1960 | Mason | 137/557 |
| 3,675,674 A | 7/1972 | Brown | |
| 3,922,746 A | 12/1975 | Strunk | |
| 4,192,342 A | 3/1980 | Adams | |
| 4,391,289 A | 7/1983 | Adams | |
| 4,898,201 A | 2/1990 | Conley et al. | |
| 4,938,246 A | 7/1990 | Conley et al. | |
| 5,530,988 A | 7/1996 | McQuillan | |
| 5,839,463 A * | 11/1998 | Blackmon et al. | 137/1 |
| 5,857,476 A | 1/1999 | Bee et al. | |
| 5,868,155 A * | 2/1999 | Hutton | 137/240 |
| 6,363,566 B1 | 4/2002 | Collins | |
| 6,865,766 B2 | 3/2005 | Pettersson | |
| 7,644,463 B1 | 1/2010 | Crawford et al. | |

* cited by examiner

METHOD AND APPARATUS FOR UNPLUGGING HYDROCARBON DRAINS OR VENTS

CROSS-REFERENCE TO RELATED APPLICATION

This application claims priority and is related to U.S. Provisional Patent Application 61/533,591 filed Sep. 12, 2011 titled "Method and Apparatus for Unplugging Hydrocarbon Drains or Vents," which is incorporated by reference in its entirety.

BACKGROUND OF THE INVENTION

1. Field of the Invention

The present invention relates to closed hydrocarbon systems. More specifically, the invention relates to an apparatus and method for unplugging drains or vents in hydrocarbon systems.

2. Description of the Related Art

In hydrocarbon industrial areas, while preparing a section of a live pipeline for maintenance, it is mandatory to ensure that the isolated segment is completely depressurized and free from any hydrocarbon toxic or combustible gases. Gasses such as $H_2S$, which may be present in the pipeline, are one of the deadliest hazards in the oil and gas industry. The usual current practice is to connect the live process pipeline vents or drains to a closed system to extract all combustible and toxic gases. However, the vents or drains of the process lines may be plugged over time preventing the proper, complete, and safe drainage of the liquids.

Connecting the pipe to a closed system by itself will not unplug the pipe because pressure gauges alone will not indicate if line is clear or plugged. Therefore when preparing a section of pipeline for maintenance operations, it is common to manually open the drain or vent to the atmosphere to ensure they are not plugged. If the vent or drain is plugged, then the operator will have to poke through it to remove any particles or sludge that has built onto the drain or vent. This practice not only poses a great deal of risk of harm for the operator, it also has the potential to contaminate the environment. If the operator is not equipped with the needed personal protection equipment, such as a self-contained breathing apparatus, he will be exposed to high concentrations of toxic fumes that have a deadly effect on his health as well as being a source of ignition during the cleaning process.

It would therefore be beneficial to have an apparatus and method for unplugging vents and drains that does not expose the operator to combustible and toxic gases nor release them into the environment.

SUMMARY OF THE INVENTION

Embodiments of the current application provide a system and method for mechanically cleaning debris from vents and drains for isolating segments of a hydrocarbon unit for maintenance purposes, while containing any contaminants in a closed system.

In one of embodiment of the current application an apparatus for unplugging a component of a hydrocarbon transportation or storage unit includes a main body, the main body comprising: a central passage through a length of the main body; a secondary passage transverse to the central passage; a connector end operable to connect the body to the drain or vent. The apparatus further includes a valve in fluid communication with the secondary passage; a pressure gauge in fluid communication with the valve; a system connector in fluid communication with the valve, operable to connect the apparatus to a closed system; and a poker rod operable to move within the central passage of the main body.

In another embodiment of the current application, the poker rod includes a crash head operable to move into the vent or drain for removing a blockage therein. The poker rod can further include external threads on an outer surface and a handle. The central passage can further include internal threads on an inner surface which engage the external threads of the poker rod.

In other embodiments, a packing creates a seal between the poker rod and the central passage. The packing can be a high pressure rated packing suitable for use with hydrocarbons. A cap can be located adjacent to the packing, and the apparatus can further include a pushing nut for maintaining the position of the cap.

In alternative embodiments, the component can be a vent or a drain, the valve can be a high pressure valve and the gauge can be a high pressure gauge.

In another embodiment of the current application, a method for unplugging a component connected to a fluid transportation or storage unit, useful in hydrocarbon application, includes the steps of, (a) connecting a component connector end of a device to the component; (b) connecting a system connector end of the device to a closed system; (c) opening a device outlet valve (d) poking an end of a rod of the device into the component; (e) evaluating if a pressure gauge of the device reads a pressure greater than zero; and (f) repeating step (d) and step (e) until the pressure gauge reads a pressure greater than zero.

In some embodiments, after step (b), a device valve of the device, a component valve of the component and a closed system valve are opened. After step (f), the device valve of the device, the component valve of the component, and the closed system valve can be closed. After step (f), the device can be disconnected from the component and the closed system when the pressure read by the pressure gauge is substantially equal to zero.

In alternative embodiments, the component connector end of the device and the system connector end of the device are in fluid communication, and any fluids passing through the device in the closed system can be collected in the closed system. The component can be a vent or a drain, and step (b) can further include clearing debris from the component.

In yet another embodiment of the current application, a method for unplugging a component connected to a fluid transportation or storage unit, useful in hydrocarbon application, comprising the steps of: (a) connecting a component connector end of a device to the component, the device comprising a poker rod operable to enter the component; (b) connecting a system connector end of the device to a closed system; (c) evaluating if a pressure gauge of the device reads a pressure greater than zero; (d) monitoring the pressure gauge until the pressure becomes substantially equal to zero; and (e) disconnecting the device from the component and the closed system.

In alternative embodiments after step (b), the poker rod is moved into the component to clear a blockage. After step (b), a device valve of the device, a component valve of the component, and the closed system valve can be opened. After step (d), the device valve of the device, the component valve of the component and the closed system valve can be closed.

In other alternative embodiments, the component connector end of the device and the system connector end of the device can be in fluid communication, and the method can further include the step of collecting any fluids passing through the device in the closed system. The component can be a vent or drain, and the method can further include the step of after step (b) clearing debris from the component with the poker rod.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE EXEMPLARY EMBODIMENTS

Figure 1:
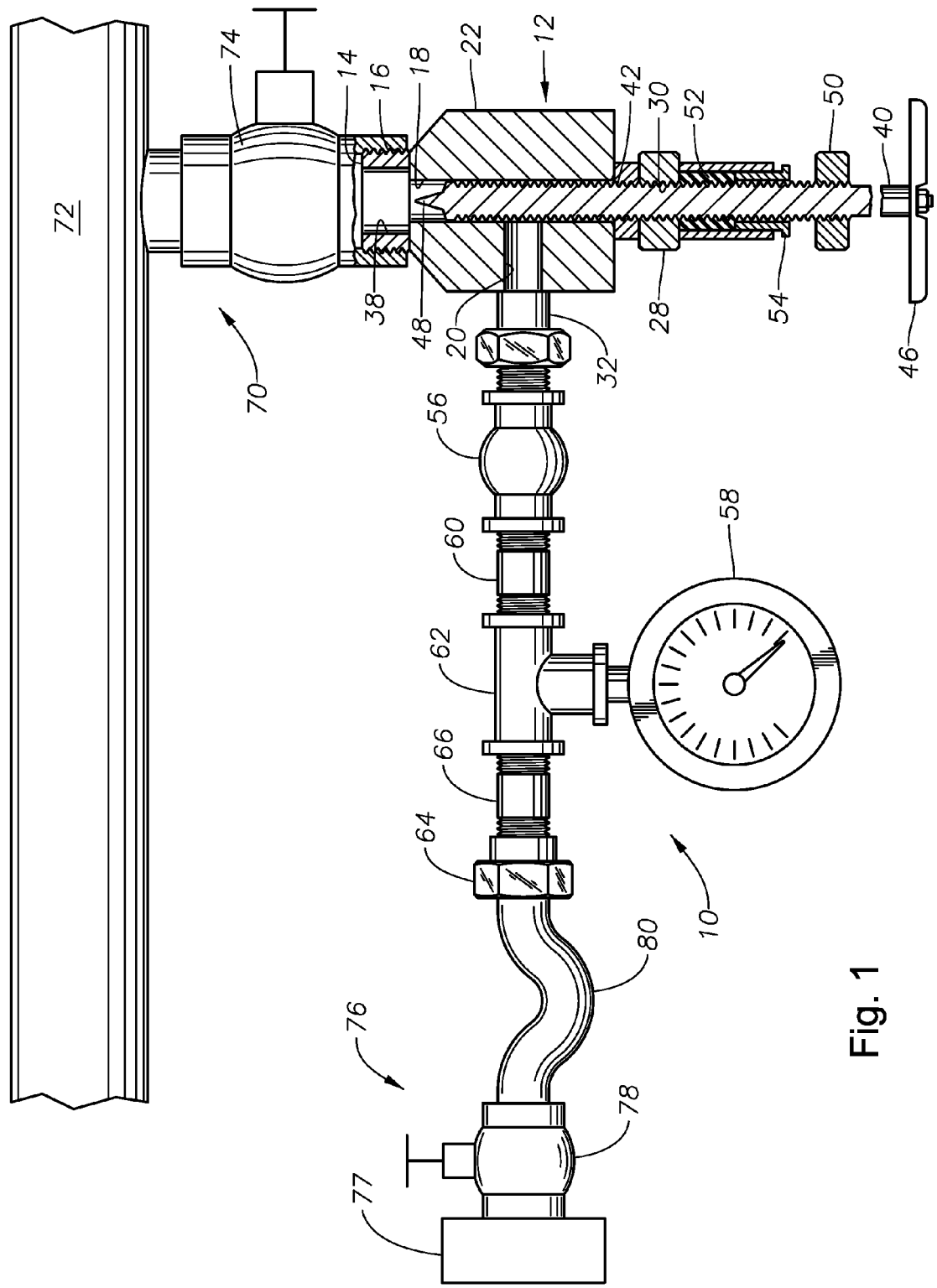
FIG. 1 is a sectional view of an embodiment of the device of the current application.

Turning to FIG. 1, a device 10 includes a body 12. Body 12 includes a main section 22, which can be solid. Body 12 has a component connector end 14 which can have connector 16 for connecting the body 12 to a component, such as, for example, outlet 70. Outlet 70 can be a vent or drain of a fluid containing unit, such as a fluid transportation or storage unit. Pipeline 72 is an example of a fluid containing unit and can be, for example, pipe or tubing. In embodiments, pipeline 72 can be a hydrocarbon pipeline used to transport, store, or produce hydrocarbons. Alternatively, the component, such as outlet 70, can be part of any other fluid containing unit or apparatus that can contain fluid such as, for example, a heat exchanger, a storage vessel, a reaction vessel, a tank, or other fluid production, transportation or storage unit. In embodiments, outlet 70 can be part of a hydrocarbon storage or production apparatus.

Connector 16 can be connected to, for example, outlet 70. Connector 16 can be a threaded connection, such as the external threads shown in FIG. 1. Depending on the specification of the components of outlet 70, connector 16 can include internal threads, a quick connect, or other fitting. Alternatively, connector 16 can require an adaptor to connect body 12 to the outlet 70. Connector 16 has a connector passage 38. Outlet 70 can include a valve 74, can be used to selectively prevent fluid from passing through outlet 70 until valve 74 is opened. When connector 16 is connected to outlet 70, and valve 74 is opened, fluid can be communicated through outlet 70 to connector passage 38 of connector 16.

Body 12 has a central passage 18 that runs through the length of main section 22. A portion of the internal wall of passage 18 can be a smooth cylindrical bore. A lower end of central passage 18 can extend beyond main section 22 to form a rod receptor 24. A portion of an outer surface of rod receptor 24 can include external threads 26. Rod receptor 24 can also include a nut 28 with interior threads 30 that protrude within central passage 18. The upper end of central passage 18 is in fluid communication with connector passage 38 of connector 16.

Body 12 also has a secondary passage 20 which can be generally transverse to central passage 18. One end of secondary passage 20 intersects with central passage 18 and the other end of secondary passage 20 extends beyond main section 22 to form a valve receptor 32. A portion of an outer surface of valve receptor 32 can have external threads 34. A nut 36 can be situated on the exterior of valve receptor 32.

Figure 2:
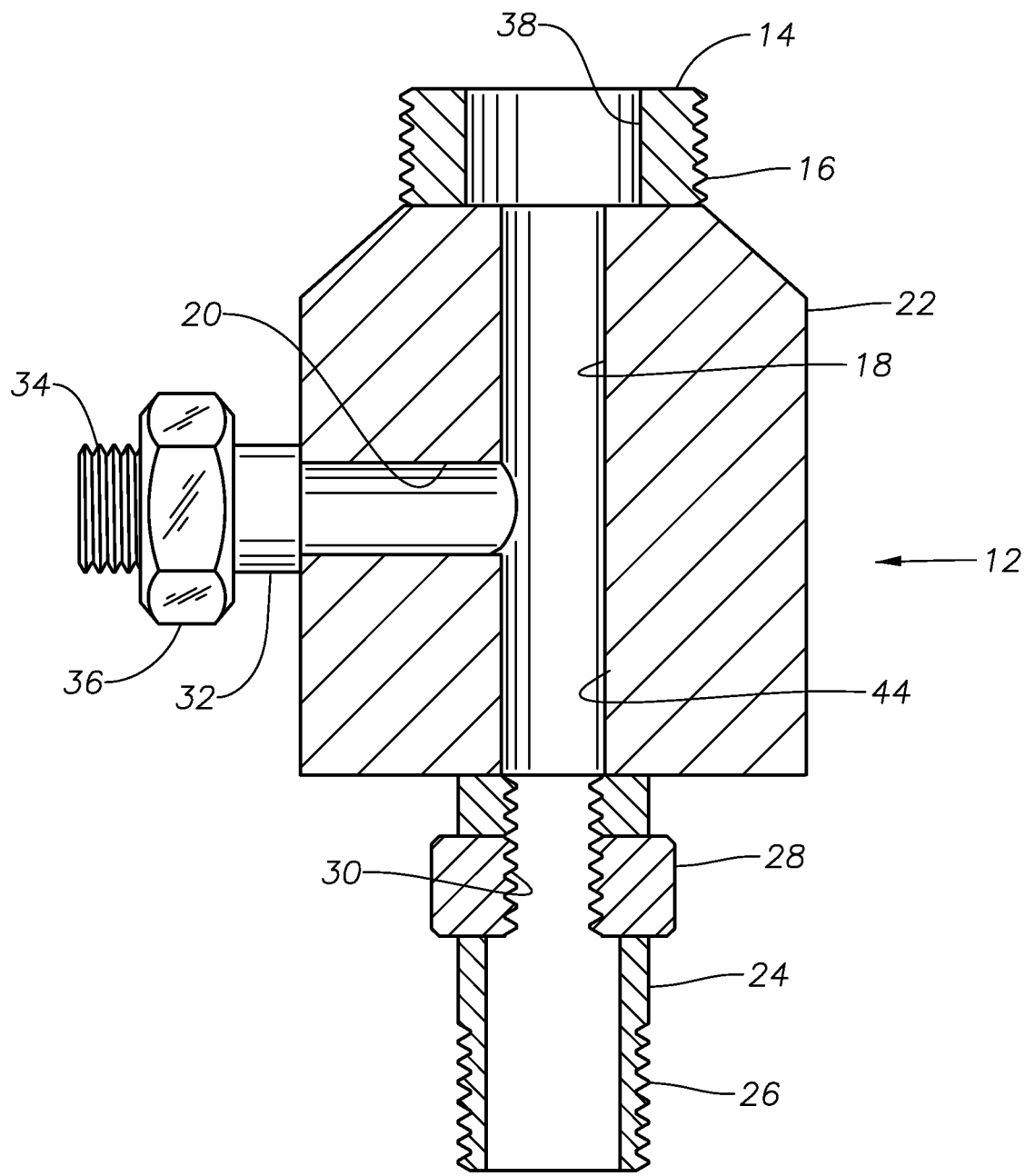
FIG. 2 is a section view of the body of the device of FIG. 1.

Returning to FIG. 1, a rod 40 is located within central passage 18. Rod 40 can have external threads 42 which mate with internal threads 30 of nut 28 to direct rod 40. Rod 40 will have an outer diameter smaller than the internal diameter of central passage 18 such that threads 42 will not come into contact with inner diameter 44 of central passage 18. Rod 40 can also include a crash head 48 at an end which is proximate to connector 16 and a handle 46 at its other end. An end of crash head 48 can be larger in diameter than an external diameter of internal threads 30 so that the crash head 48 will not easily come out of body 12 past internal threads 30. A seal, such as packing 52, suitable for the type of fluid to be vented or drained by device 10, such as hydrocarbon, and having a high-pressure rating can be located within rod receptor 24. Packing 52 is contained between a portion of rod receptor 24 adjacent an outward side of nut 28 and a cap 54, which is situated proximate to the lower end of rod receptor 24 and creates a seal between rod 40 and central passage 18. Packing can be formed of a deformable material and compressed to provide an effective pressure seal between the fluid in body 12 and the outside atmosphere. A pushing nut 50 can be used to secure and stress the cap 54 so that cap 54 maintains packing 52 in a compressed state. In alternative embodiments, pushing nut 50 can be threaded onto external threads 26 (best shown in FIG. 2). Other types of seals can be used to seal the annulus between rod receptor 24 and rod 40.

Figure 3:
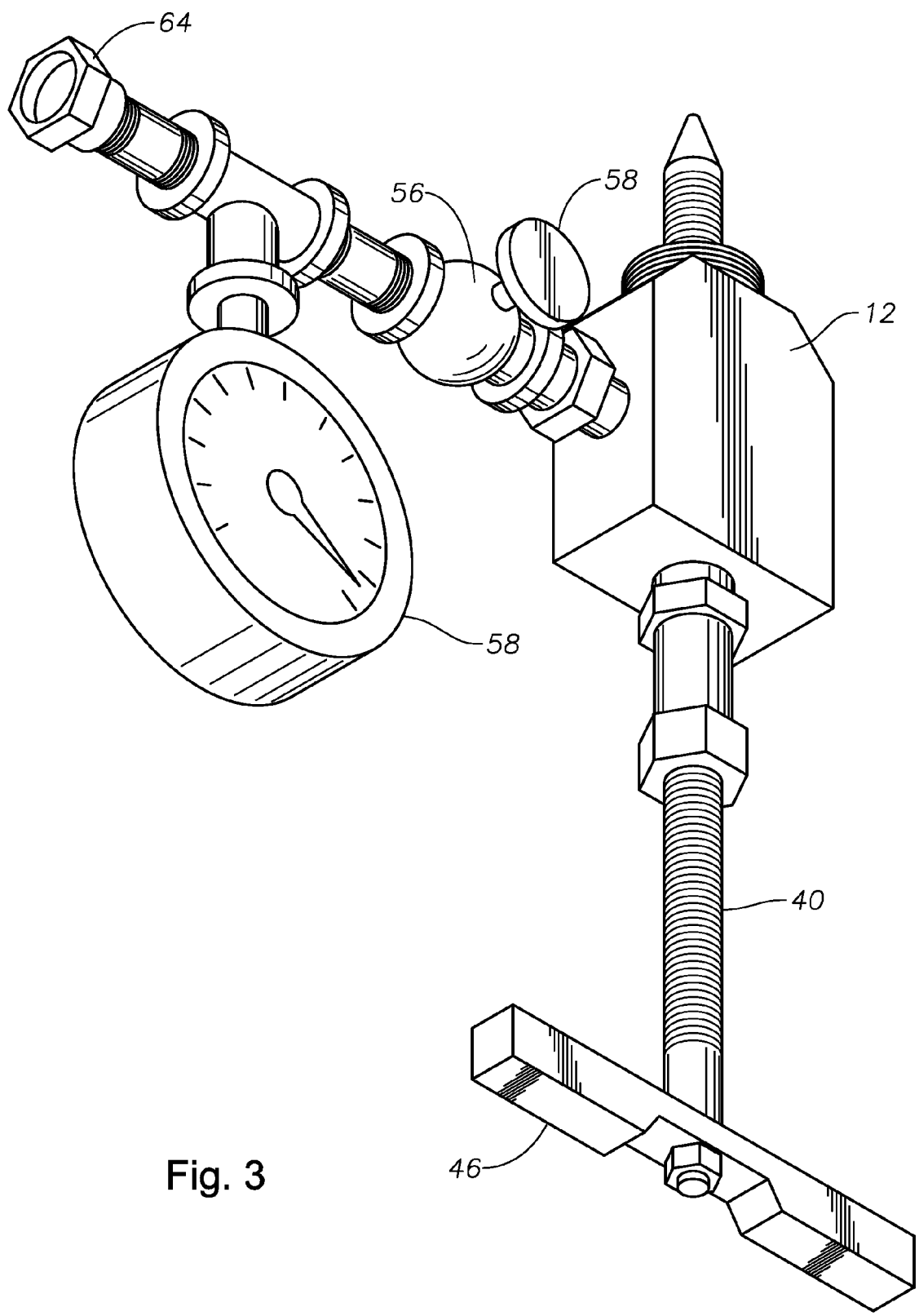
FIG. 3 is a perspective view of the device of FIG. 1.

A valve 56 can be connected to valve receptor 32 and is in fluid communication with secondary passage 20. As seen in FIG. 3, valve 56 can have a handle 58 which allows an operator to open and close the passage through the valve. Valve 56 can be, for example, a high-pressure rate stainless steel isolation valve with female connectors at both ends.

Returning to FIG. 1, device 10 also includes a pressure gauge 58. Pressure gauge 58 is in fluid communication with valve 56, either directly, or as shown in FIG. 1, by way of a threaded nipple 60 and threaded tee connector 62, or other connection means. Nipple 60, connector 62 and any other connector can be high-pressure rate stainless steel components. Pressure gauge 58 can be a high pressure gauge.

Device 10 can also include a system connector 64, which can be used to connect device 10 to a closed system 76. System connector 64 can be a high pressure rate union connector, as shown in FIG. 1. Depending on the specification of the components of the closed system 76 to be used with the device, system connector 64 can include external threads, internal thread, a quick connect, or other fitting. Closed system 76 is a fluid disposal system, or fluid receiving system, that can be used to contain fluid that is drained or vented through device 10 from outlet 70. Closed system 76 can include, for example, a receptacle 77, which can include a vessel, vacuum source, pump, or other apparatus suitable for accepting fluid and preventing fluid from leaking or otherwise escaping into the atmosphere. The closed system 76 can include a closed system valve 78, which can be opened or closed by the operator. Closed system 76 can also include tubing 80 which can be connected to system connector 64. System connector 64 can require an adaptor to connect device 10 to the closed system 76. System connector 64 is in fluid communication with valve 56 and can be connected directly to valve 56, directly to pressure gauge 58 or can be connected by way of threaded nipple 66 or other connector.

Figure 4:
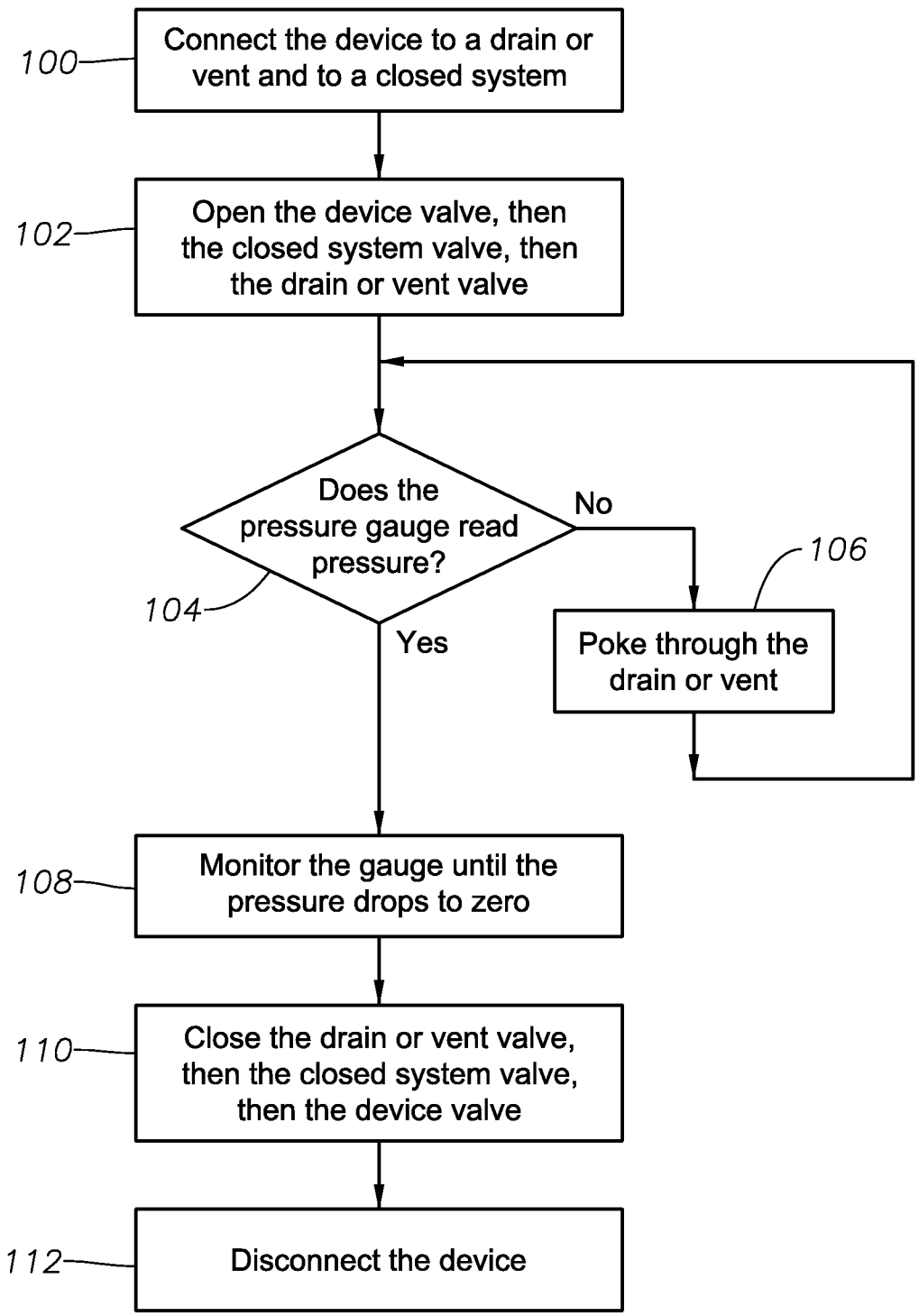
FIG. 4 is a flow diagram of the steps of a method of the current application.

Turning to FIG. 4, in operation, the first step 100 is to connect the device 10 to outlet 70 of tubing 72, and to closed system 76. Looking at FIG. 1, connector end 14 of body 12 makes the connection with the outlet 70 and system connector 64 makes the connection with the closed system 76. At this point, both the valve 74 that is part of the outlet 70 and valve 56 are closed.

Returning to FIG. 4, the next step 102 is to open the valve 56, then the valve 78 associated with the closed system 76, then the valve 74 associated with the outlet 70. Looking once again at FIG. 1, valve 56 is in fluid communication with secondary passage 20, which in turn is fluid communication with central passage 18. Therefore any fluids within the tubing 72 can now pass into central passage 18, and through valve 56. If the outlet 70 is clear, pressure gauge 58, which is also in fluid communication with valve 56, will read pressure.

Returning to FIG. 4, the next step 104 is therefore to check if pressure gauge 58 reads pressure greater than zero. If the answer is yes, the operator next executes step 108. If the answer is no, the operator executes step 106. In step 106, the operator uses rod 40 to poke through the outlet 70 to free any sludge or particles. In embodiments, rod 40 can pass through valve 74, provided that valve 74 is open. Looking at FIG. 1, by turning handle 46, the operator can move rod 40 up and down relative to body 112. Crash head 48 will enter the outlet 70, including valve 74, through connector passage 38, and mechanically free the outlet 70 of the sludge, particles or other blockage.

Returning once again to FIG. 4, after executing step 106, the operator will then return to step 104 and once again determine if pressure gauge 58 reads pressure. If the answer is still no, the operator once again executes step 106 of poking through the outlet 70 and step 104 of determining if pressure gauge 58 reads pressure until such time as the operator can answer yes to the question of step 104, that the pressure gauge 58 reads pressure. At that point, the operator executes step 108.

In step 108, the operator monitors pressure gauge 56 (FIG. 1) until the pressure drops to substantially zero. This pressure drop is an indication that the fluids within the pipeline 72 have been drained. Looking at FIG. 1, the fluids in the pipeline 72 would pass through the outlet 70 valve 74 into connector passage 38 of connector 14. These fluids are unable to escape through central passage 18 because packing 52 creates a seal sufficient to prevent the fluids from reaching the lower end of central passage 18. Fluids instead pass through valve 56 and system connector 64 and into the closed system 76. The fluids are collected in the closed system 76, keeping both the operator and the environment free of and safe from any toxic or combustible gasses.

Next the operator executes step 1110 by closing the valve 74 connected to the pipeline 72, then the valve 78 associated with the closed system 76. Turning again to FIG. 1, the operator also closes valve 56 (FIG. 1). Finally in step 112 of FIG. 4, the operator then disconnects the device 10 from both the closed system 76 and valve 74 of outlet 70.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An apparatus for unplugging an outlet and venting or draining a fluid through the outlet, the apparatus comprising:
a main body comprising:
a central passage through a length of the main body, the central passage being coaxial with an outlet;
a secondary passage extending transverse to, and from the central passage through a first side of the main body;
a connector end operable to connect the body to the outlet, the connector end being coaxial with the central passage;
a valve in fluid communication with the secondary passage, the valve joined with and spaced from, the first side of the main body;
a pressure gauge in fluid communication with the valve, the pressure gauge joined with and spaced from, the first side of the main body;
a closed system in fluid communication with the valve through a system connector; and
a poker rod operable to move axially along the central passage of the main body.

2. The apparatus of claim 1, wherein the poker rod comprises a crash head operable to move into the outlet for removing a blockage therein.

3. The apparatus of claim 1, wherein the poker rod has a generally constant outer diameter and further comprises external threads on an outer surface and a handle, the external threads ding from adjacent a crash head end of the poker rod to adjacent the handle.

4. The apparatus of claim 3, wherein the central passage further comprises internal threads on an inner surface which engage the external threads of the poker rod.

5. The apparatus of claim 1, further comprising a seal between the poker rod and the central passage, the seal engaging a threaded outer diameter of the poker rod.

6. The apparatus of claim 5, wherein the seal is a high pressure rated packing suitable for use with hydrocarbons.

7. The apparatus of claim 6, further comprising a cap located adjacent to the packing, and a pushing nut for maintaining the position of the cap.

8. The apparatus of claim 1, wherein the outlet is selected from a group consisting of a vent and drain.

9. The apparatus of claim 1, wherein the valve is a high pressure valve and the gauge is a high pressure gauge.

10. The apparatus of claim 1, wherein the pressure gauge is spaced in fluid communication farther from the main body than the valve is spaced in fluid commination from the main body, so that the fluid venting or draining from the outlet first flows past the valve before flowing past the pressure gauge.

11. The apparatus of claim 1, wherein the system connector is joined with the first side of the main body and spaced in fluid communication farther from the main body than the valve and the pressure gauge are spaced in fluid commination from the main body, so that the fluid venting or draining from the outlet first flows past the valve and the pressure gauge before reaching the system connector.

12. A method for unplugging a component connected to a fluid containing unit and venting or draining a fluid from the fluid containing unit through the component, the method useful in hydrocarbon application, and comprising the steps of:
 (a) connecting a component connector end of a device to the component, the device having:
  a central passage through a length of a main body;
  a secondary passage extending transverse to, and from the central passage through a first side of the main body;
  a device valve in fluid communication with the secondary passage, the device valve joined with and spaced from, the first side of the main body;
  a pressure gauge in fluid communication with the device valve, the pressure gauge joined with and spaced from, the first side of the main body;
 (b) connecting a system connector of the device to a closed system;
 (c) poking an end of a rod of the device axially through the central passage and into the component;
 (d) evaluating if the pressure gauge reads a pressure greater than zero;
 (e) repeating step (c) and step (d) until the pressure gauge reads a pressure greater than zero; and
 (f) passing fluid through the device from the fluid containing unit and into to the closed system.

13. The method of claim 12, wherein the closed system comprises a closed system valve, the method further comprising the steps of after step (b), the device valve, a component valve of the component, and the closed system valve are opened.

14. The method of claim 13, wherein after step (e), the device valve of the device, the component valve of the component, and the closed system valve are closed.

15. The method of claim 12, wherein after step (e), the device is disconnected from the component and the closed system when the pressure read by the pressure gauge is substantially equal to zero.

16. The method of claim 12, wherein:
 the component connector end of the device and the system connector of the device are in fluid communication;
 the component connector end is located at and end of the central passage;
 the system connector is joined to the secondary passage; and wherein
 the method further comprises collecting any fluids passing through the device in the closed system.

17. The method of claim 12, wherein the component is selected from a group consisting of a vent and drain, and step (b) further comprises clearing debris from the component.

18. The method of claim 12, further comprising after step (e) closing the device valve to prevent the fluid from reaching the pressure gauge.

19. A method for unplugging a component connected to a fluid containing unit and venting or draining a fluid from the fluid containing unit through the component, the method useful in hydrocarbon application, and comprising the steps of:
 (a) connecting a component connector end of a device to the component, the device comprising:
  a central passage through a length of a main body;
  a secondary passage extending transverse to, and from the central passage through a first side of the main body;
  a device valve in fluid communication with the secondary passage, the device valve joined with and spaced from, the first side of the main body;
  a pressure gauge in fluid communication with the device valve, the pressure gauge joined with and spaced from, the first side of the main body; and
  a poker rod operable to move axially along the central passage and enter the component;
 (b) connecting a system connector of the device to a closed system;
 (c) evaluating if a pressure gauge of the device reads a pressure greater than zero;
 (d) passing fluid through the device from the fluid containing unit and into to the closed system;
 (e) monitoring the pressure gauge until the pressure becomes substantially equal to zero; and
 (f) disconnecting the device from the component and the closed system.

20. The method of claim 19, wherein after step (b), the poker rod is moved into the component to clear a blockage.

21. The method of claim 19, wherein the closed system comprises a closed system valve, the method further comprising the steps of after step (b), the device valve, a component valve of the component, and the closed system valve are opened.

22. The method of claim 21, wherein after step (e), the device valve of the device, the component valve of the component, and the closed system valve are closed.

23. The method of claim 19, wherein:
 the component connector end of the device and the system connector of the device are in fluid communication;
 the component connector end is located at and end of the central passage;
 the system connector is joined to the secondary passage; and wherein
 the method further comprises collecting any fluids passing through the device in the closed system.

24. The method of claim 19, wherein the component is selected from a group consisting of a vent and drain, further comprising the step of after step (b) clearing debris from the component with the poker rod.

25. The method of claim 19, further comprising after step (e) closing the device valve to prevent the fluid from reaching the pressure gauge.

* * * * *

UNITED STATES PATENT AND TRADEMARK OFFICE
CERTIFICATE OF CORRECTION

| | |
|---|---|
| PATENT NO. | : 9,073,101 B2 |
| APPLICATION NO. | : 13/611632 |
| DATED | : July 7, 2015 |
| INVENTOR(S) | : Saleh H. Al-Shammari |

It is certified that error appears in the above-identified patent and that said Letters Patent is hereby corrected as shown below:

In the Claims

In Column 6, Line 44, Claim 3, the second word appears as "ding" and should read --extending--.

Signed and Sealed this
Seventeenth Day of November, 2015

Michelle K. Lee
*Director of the United States Patent and Trademark Office*